March 5, 1940.  M. COMFORT  2,192,340
VEGETABLE AND FRUIT PEELING MACHINE
Filed June 28, 1939  4 Sheets-Sheet 1
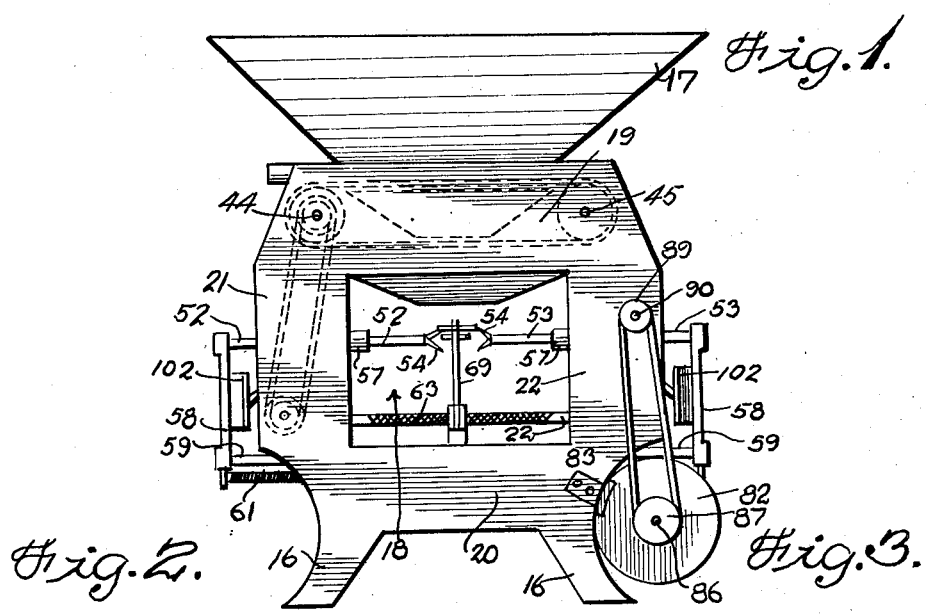
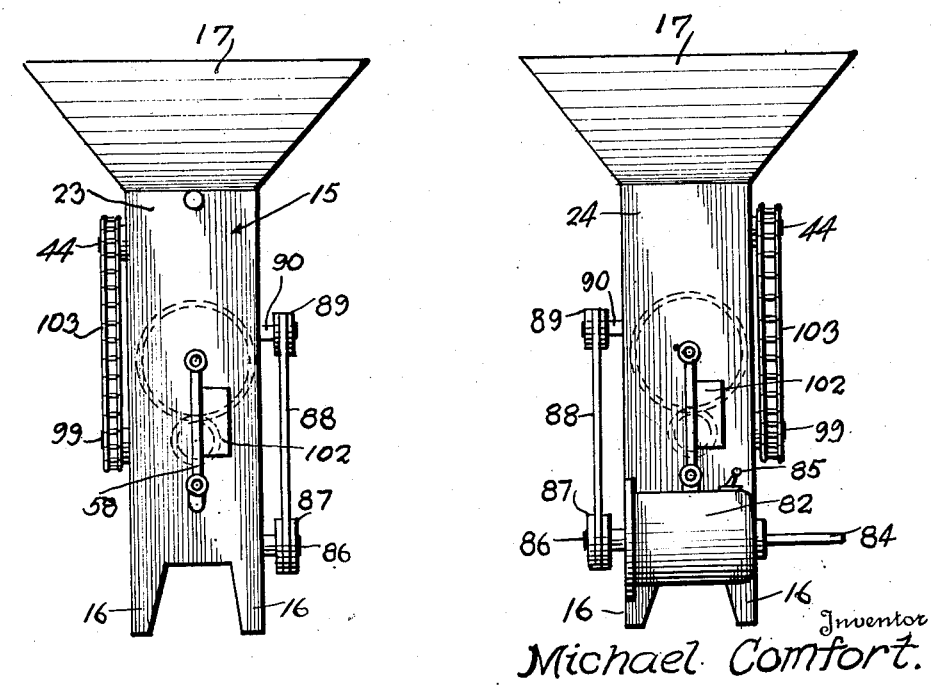
Inventor
Michael Comfort.
By Bryant & Lowry
Attorneys

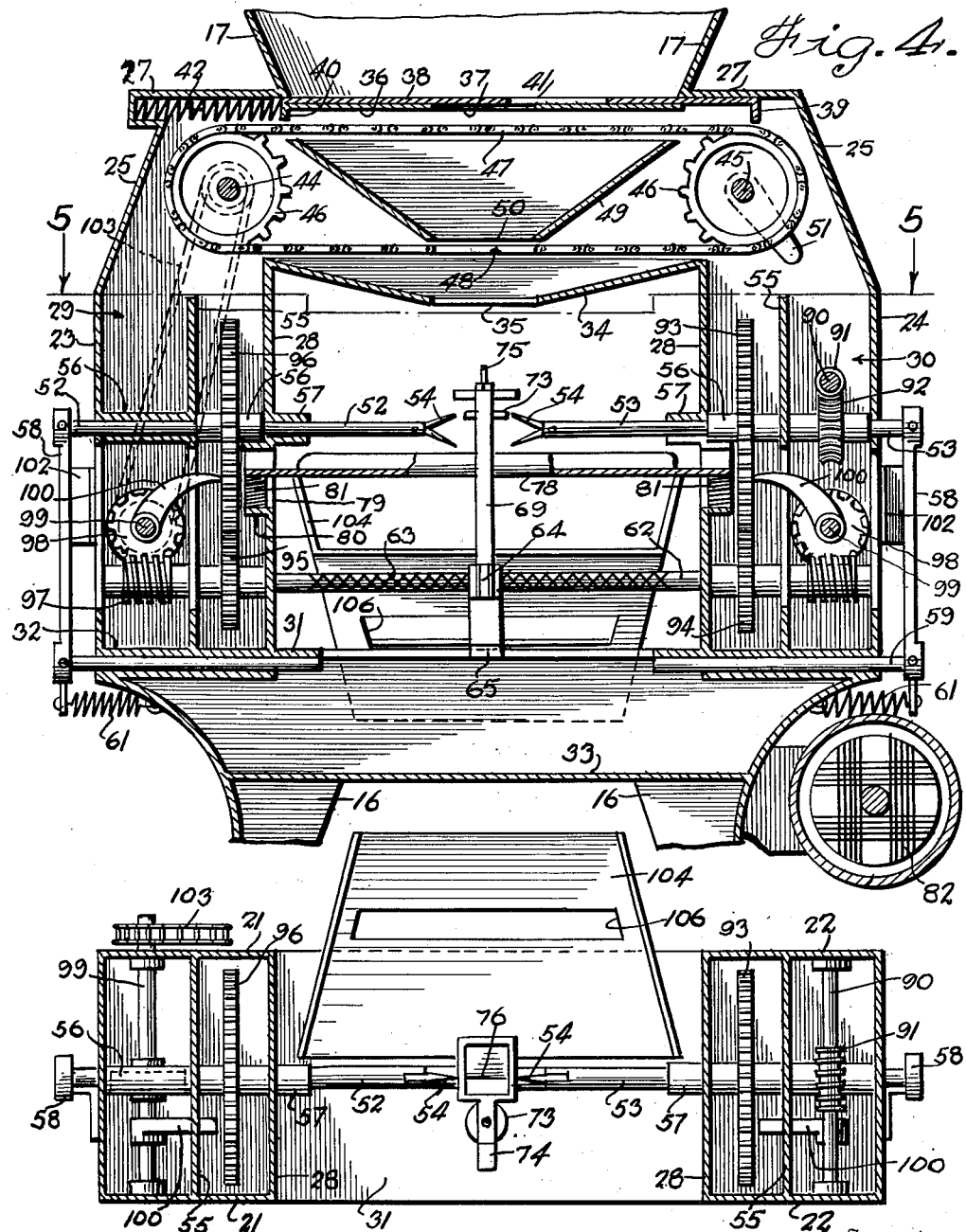

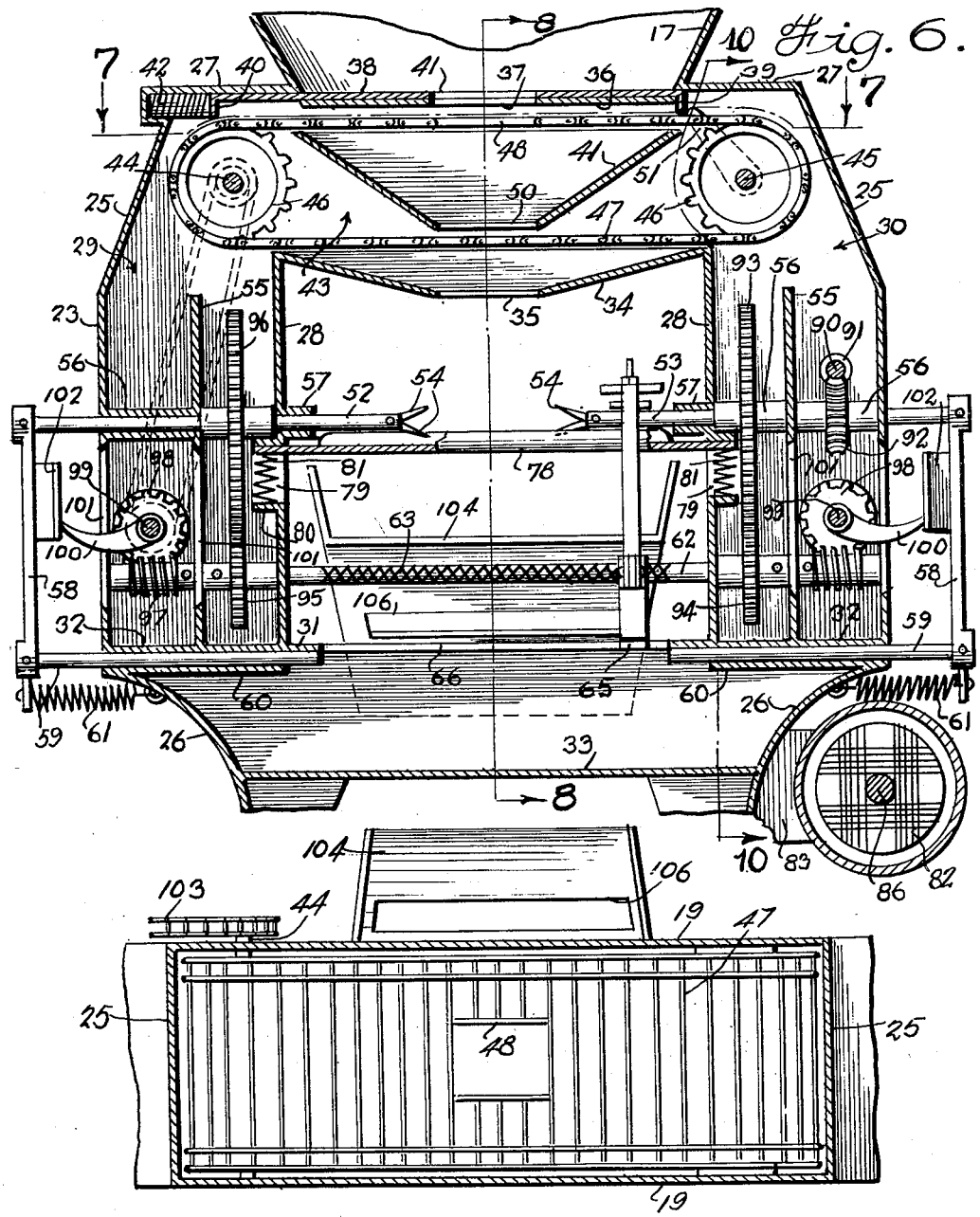

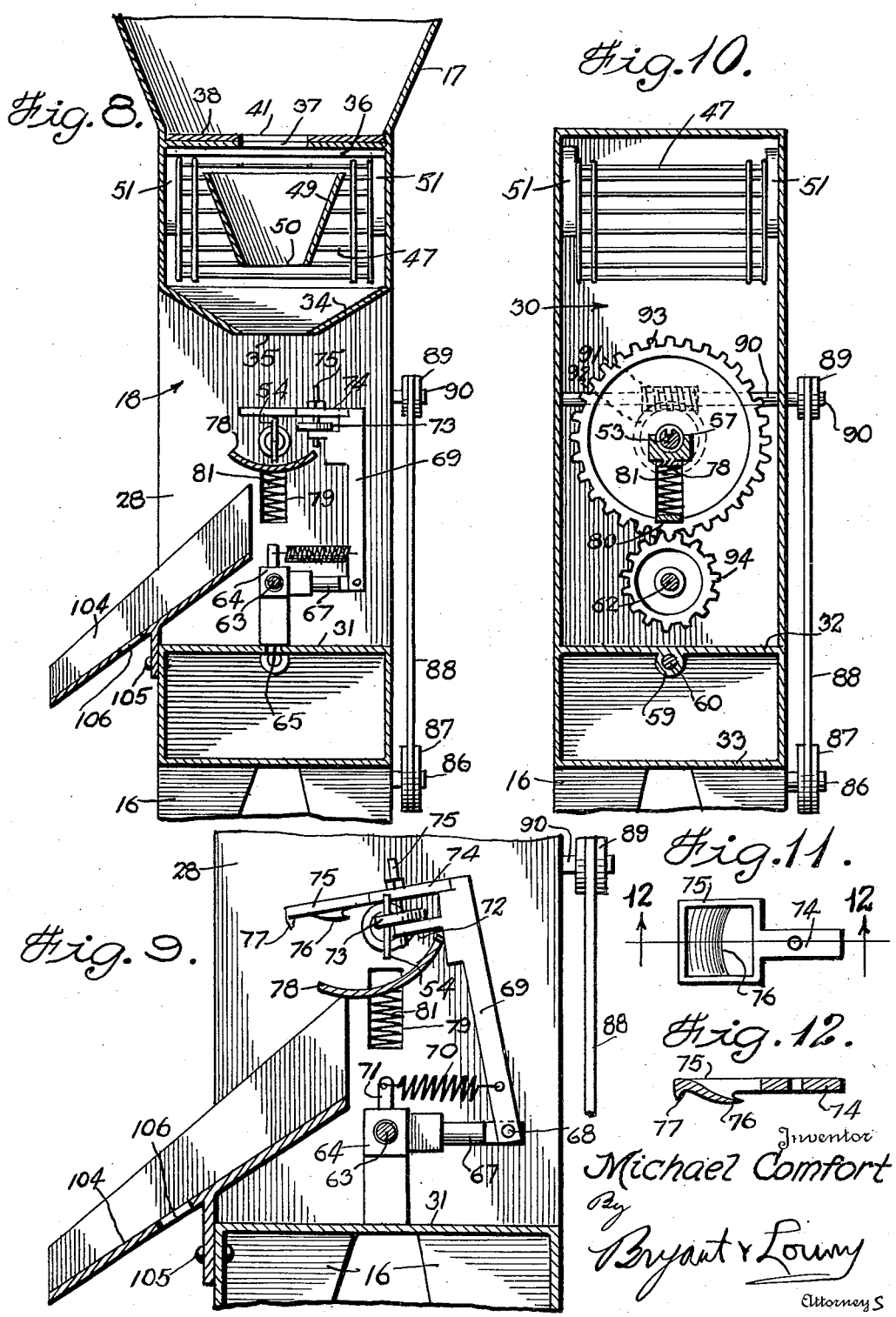

Patented Mar. 5, 1940

2,192,340

UNITED STATES PATENT OFFICE 2,192,340

VEGETABLE AND FRUIT PEELING MACHINE

Michael Comfort, Menasha, Wis., assignor of one-fourth to Emily Moore, and one-fourth to Joseph Zolkoski, both of Menasha, Wis.

Application June 28, 1939, Serial No. 281,592

12 Claims. (Cl. 146—43)

This invention relates to certain new and useful improvements in vegetable and fruit peeling machines.

The primary object of the invention is to provide a vegetable and fruit peeling machine, especially designed for the peeling of potatoes, turnips, carrots and similar vegetables as well as such fruits as apples, pears and the like, but for purposes of clarity, the invention will be hereinafter referred to as a potato peeler.

A further object of the invention is to provide a peeling machine of the foregoing character wherein potatoes are singly delivered to a pair of gripping members reciprocable towards and away from each other for the gripping and releasing of a potato with a cutter or paring knife tensioned in a direction toward a potato to be peeled and mounted upon a support that is reciprocably mounted for moving the cutter longitudinally of a potato.

With the above and other objects in view that will become apparent as the nature of the invention is better understood, the same consists in the novel form, combination and arrangement of parts hereinafter more fully described, shown in the accompanying drawings and claimed.

In the drawings:

Figure 1 is a side elevational view of a vegetable or fruit peeling machine constructed in accordance with the present invention;

Figure 2 is an end elevational view;

Figure 3 is an end elevational view of the other end of the machine;

Figure 4 is a vertical longitudinal sectional view with the supporting legs broken away and illustrating the gripping rods in their potato gripping position, together with the devices for rotating the potato gripping rods and the reciprocating means for the potato paring knife or cutter;

Figure 5 is a horizontal sectional view taken on line 5—5 of Figure 4, showing the laterally disposed chute for the discharge of the peeled potatoes and the cross slot therein for the discharge of the potato peelings;

Figure 6 is a vertical longitudinal sectional view, partly broken away, similar to Figure 4, showing the potato gripping rods in their separated releasing positions;

Figure 7 is a horizontal sectional view taken on line 7—7 of Figure 6, showing a chain belt with an opening in one run thereof for the delivery of a potato to the potato gripping rods;

Figure 8 is a vertical cross-sectional view taken on line 8—8 of Figure 6, showing the potato receiving tray beneath the gripping rods and the tensioned bracket supporting the cutter in their normal potato peeling positions;

Figure 9 is a fragmentary cross-sectional view on an enlarged scale, similar to Figure 8, showing the potato receiving tray and the tensioned cutter carrying brackets in their tilted position for the discharge of a peeled potato in the laterally disposed discharge chute;

Figure 10 is a vertical cross-sectional view taken on line 10—10 of Figure 6;

Figure 11 is a top plan view of the cutter or potato peeler detached from its carrying bracket; and Figure 12 is a vertical longitudinal sectional view taken on line 12—12 of Figure 11, showing the potato peeling blade and potato eye removing pin.

While the potato peeling machine may be of any shape, design or configuration desired, the same is illustrated as being of general oblong rectangular formation and as shown in Figs. 1 to 3, comprises a body portion designated in general by the reference character 15, carrying supporting feet 16 at its lower end with a hopper 17 mounted upon the upper end of the body portion 15.

The body section 15 comprises a pair of side walls, each having a relatively large rectangular opening 18 therein that converts said side walls into upper and lower panels 19 and 20 and vertical end panels 21 and 22, the inner edges of said panels bordering the opening 18. The side walls are connected by end walls 23 and 24 at the outer edges of the panels 21 and 22, the outer ends of the upper and lower panels 19 and 20 being connected by end wall sections 25 and 26 respectively that are continuations of the end walls 23 and 24. The upper ends of the side wall sections of the body portion 15 carry end top wall sections 27 from which the hopper 17 rises. As shown more clearly in Figs. 4 and 6, the inner edges of the vertical end panels 21 and 22 are connected by cross walls 28 that border the opening 18 and cooperate with the end wall sections 23 to 25 to form chambers or housings 29 and 30 for the operating mechanism of the potato peeler. The opening 18 is closed at its lower side by a horizontal wall 31 extending between the upper edges of the lower panels 20 of the side walls and extensions 32 on opposite ends of the wall 31 provide bottom walls or closures for the lower ends of the housings 29 and 30. A horizontal cross wall 33 connects the lower edges of the lower panels 20. An inverted frusto-pyramidal wall 34 having a central opening 35 therein extends across the upper end of the opening 18 and forms a part of the wall structure bordering said opening 18.

The potatoes to be peeled are placed in the hopper 17 and are singly delivered to the top wall 34 overlying the opening 18 for passage through the opening 35 centrally of said wall 34 to be gripped and held by a pair of supporting rods to be presently described. As shown more clearly in Figures 4 and 6, the hopper 17 has a bottom wall 36 disposed slightly below the end top wall sections 27 of the body portion 15 and is provided with a central opening 37 of a size to permit the single passage of an average sized potato therethrough. A valve plate or slide 38 is mounted upon the upper face of the bottom wall 36 of the hopper and slidably extends through end openings in the lower end of the hopper, the opposite ends of the slide plate 38 carrying depending abutments 39 and 40 respectively while said plate intermediate its end is provided with an opening 41 adapted to register with the opening 37 in the bottom wall 36 of the hopper 17 as shown in Figure 6. The slide plate 38 is normally positioned as shown in Figure 4, with the openings 37 and 41 out of registry by means of a coil spring 42 engaged at one end with the abutment 40 on the slide plate and engaged at its other end with the adjacent end wall section 25. The vertical spacing of the top wall 34 of the opening 18 and the top wall sections 27 and 36 at the upper end of the body portion 15 provides a housing 43 and in which housing an endless belt, preferably of the chain type, is mounted for singly feeding potatoes to the potato-gripping members disposed in the opening 18. As shown in Figures 3 and 4, a pair of shafts 44 and 45 is respectively journaled at opposite ends of the housing 43 and at the upper ends of the housings 29 and 30, said shafts 44 and 45 carrying sprocket wheels 46 over which the endless chain belt 47 travels. A potato passage opening 48 is formed in the chain belt 47 and is adapted to register with the openings 37 and 41 in the bottom wall 36 of the hopper and the slide plate 38. A conical guide 49 is mounted in the housing 43 between the runs of the endless chain belt 47 and has a bottom discharge opening 50 therein. The device for effecting sliding movement of the plate 38 across the lower end of the hopper 17 includes an arm 51 carried by the shaft 45 and projecting radially therefrom, the outer end of said arm being movable into engagement with the abutment 39 on the adjacent end of the slide plate 38 for moving the latter against the tension of the spring 42, as will be readily understood from an inspection of Figure 6. Operating means for the endless chain belt 47 will be presently described.

A pair of rotatable and reciprocating potato gripping rods 52 and 53 horizontally extend through the chambers 29 and 30 respectively and project through the inner and outer walls thereof, the inner ends of the rods 52 and 53 having potato gripping fingers 54. A perpendicular wall 55 rises from the bottom wall 32 of each chamber 29 and 30 between the inner walls 28 and the outer walls 23 and 24 respectively of said housings and tubular bearings 56 extend between said walls 55 and the outer walls 23 and 24 for the mounting of said rods 52 and 53, a further bearing 57 being carried by the walls 28 for said rods 52. An arm 58 is anchored to and depends from the outer end of each rod 52 and the lower end of each arm 58 is secured to the outer end of a guide rod 59 that is horizontally disposed and extends through a guide bearing 60 carried by the bottom face of the adjacent bottom wall 32 of the housings 29 and 30. The means for rotating and reciprocating the potato gripping rods 52 will be presently described. The potato gripping rods are normally retained in the potato gripping positions shown in Fig. 4 by means of coil spring connections 61 between the lower ends of the arms 58 and the end wall portions 26 of the lower panels 20.

The potato peeling knife and operating devices therefor are shown more clearly in Figs. 4 and 6 and include a shaft 62 extending across the opening 18 below the potato gripping arms 52 with the ends of said shaft 62 extending through the housings 29 and 30 and journaled in the walls thereof. A double reverse screw thread 63 is formed on the shaft 62 within the opening 18. A screw block 64 is shown in Figs. 8 and 9 as being engaged with the double threaded portion 63 of the shaft 62 and said block 64 has a guide finger 65 depending therefrom that moves through a longitudinally extending slot 66 in the bottom wall 31 of the opening 18. An arm 67 is laterally carried by the screw block 64 and extends at right angles to the shaft 62 and pivotally supports at its outer end as at 68, the lower end of an upstanding lever arm 69 that is tensioned in a direction toward said shaft 62 by means of a coil spring 70 extending between the lever arm 69 and a stud 71 rising from the screw block 64. The upper end of the lever arm 69 terminates in the general vicinity of the potato gripping rods 52 and 53 and a bracket arm 72 projecting laterally of the upper end of the lever arm 69 rotatably supports a roller or wheel 73 moving in rolling contact with a potato gripped between the fingers 54 on the rods 52 and 53. The potato paring knife shown in detail in Figs. 11 and 12 comprises an arm 74 mounted upon the bearing pin 75 upon which the wheel 73 is journalled, the forward end of the arm 74 carrying a rectangular frame 75 from which a depending curved paring blade 76 is pressed, the forward end of the frame 75 carrying a depending finger 77 between the ends thereof for the removal of eyes from a potato.

An elongated transversely curved potato supporting tray 78 extends across the opening 18 below the potato gripping rods 52, the walls 28 of the housing 29 and 30 having vertically slotted openings 79 formed therein into which opposite ends of the tray 78 freely pass, the formation of the openings 79 providing lugs 80 that extend into the respective housings with coil springs 81 interposed between said lugs 80 and adjacent ends of the tray 78 for the resilient support of the latter, the resilient mountings for the ends of the tray 78 being of a character to permit laterally tilting movement of the tray. Upon rotation of the shaft 62, the screw block 64 travels in reverse reciprocatory directions over the double screw threaded portion 63 of said shaft with the peeling blade 76 moving over a potato gripped by the fingers 54 of the potato gripping rods 52.

The operating means for the endless belt or chain 47, the potato gripping rods 52 and 53 and the screw shaft 62 comprises an electric motor 82 mounted on the lower end of the body portion 15 below the end wall 24 by means of bracket arms 83 that attach the motor to the body portion. The motor 82 has a conduct connection 84 with a source of energy and the operation of the motor is controlled by the hand switch 85 shown in Figure 3. The shaft 86 of the motor 82 carries a pulley 87 that has a belt connection 88 with a pulley 89 that is secured to a projecting end of a shaft 90 journaled transversely of the housing 30 in the panel wall 22 thereof above the bearing 56 for the potato gripping rod 53. The shaft 90 carries a worm 91 intermediate the ends thereof that is engaged with a worm wheel 92 that has its center bearing extending to a cut-out in the bearing 56 for a splined connection with the potato gripping rod 53, the worm 91 and worm wheel 92 being positioned in the housing 39 between the end wall 24 and upstanding intermediate wall 55. A gear wheel 93 has its center bearing extending to a cut-out portion in the bearing sleeve 56 between the wall 55 and adjacent wall 28 in the housing 30 for a splined connection with the potato gripping rod 53 and said gear wheel 93 meshes with a pinion 94 on the shaft 62 for transmitting rotary motion from the potato gripping shaft 53 to the shaft 62. The end of the shaft 62 within the housing 29 between the wall 55 and inner wall 28 of said housing has a pinion 95 keyed thereon that engages a gear wheel 96 splined upon the potato gripping rod 52. It will therefore be seen that rotation of the potato gripping rod 53 is transmitted to the shaft 62 and from said shaft to the potato gripping rod 52, and that upon rotation of said shaft 62, the screw block 64 mounted thereon and carrying the lever arm 69 having the potato peeling knife 76 at its upper end is reversely movable over the threaded portion 63 of said shaft 62.

To effect reciprocating movements of the potato gripping rods 52 and 53 into potato gripping and releasing position, each end of the shaft 62 within the housings 29 and 30 and in the compartments of said housings outwardly of the walls 55 is provided with a worm 97 that meshes with a worm wheel 98 keyed to a shaft 99 journaled transversely of the associated housing. Each shaft 99 carries a cam arm 100 movable through openings 101 in the wall 55 and adjacent end wall of the housing for engagement with a plate 102 carried by the adjacent arm 58 that connects the potato gripping rods with the lower guide rod 59. It will be seen that upon rotation of the shaft 62, the cam arms 100 are movable from the position shown in Figure 4 to the position shown in Figure 6 for separating the potato gripping rods 52 and 53 and when the cam arms 100 are disengaged from the plate 102, the springs 61 automatically retract the rods 52 and 53 into potato gripping position.

The operating means for the endless belt 47 is derived from the shaft 99 journalled in the housing 29, one end of said shaft projecting outwardly of said housing as shown in Figure 2 with the sprocket wheel thereon over which a sprocket chain 103 passes, the shaft 44 projecting outwardly of the housing 43 at the upper end of the body portion and having a sprocket wheel thereon over which said sprocket chain 103 passes.

Potatoes or other vegetables or fruits are placed in the hopper 17 and when the machine is in operation, the arm 51 carried by the shaft 45 moves the slide plate 38 against the tension of the spring 42 to place the opening 41 therein in registry with the opening 37 in the bottom wall 36 of the hopper 17 and at this time the chain belt 47 has been moved to place the opening 48 therein in registry with such openings 37 and 41 so that the single potato will be delivered into the conical guide 49 between the runs of the endless belt and be supported upon the lower run of the belt. After a single potato has been discharged through the openings 41, 37 and 48, the arm 51 escapes the abutment 39 upon the slide plate 38 and the spring 42 shifts the slide plate to close the opening 37 in the bottom wall 36 of the hopper. Continued movement of the endless belt 47 places the opening 48 therein in registry with the discharge opening 50 in the lower end of the conical guide 49 for the discharge of a single potato onto the conical guide wall 34 at the upper end of the opening 18 in the body portion of the machine, the potato falling upon the tray 78 and being engaged by the fingers 54 of the potato gripping arms 52 and 53. The potato gripping rods are in their separated positions as shown in Figure 6 and when so disposed a potato is delivered between the ends thereof, the rotation of the shaft 62 causes the cam arms 100 to be moved out of engagement with the plate 102 so that the springs 61 can retract the potato gripping rods 52 and 53 into potato gripping position with the ends thereof adjacent each other as shown in Figures 1 and 4. When so disposed, rotation of the shaft 62 causes the screw block 64 to move over the threaded portion 63 of said shaft with the guide wheel 73 upon the upper end of the tensioned lever arm 69 being engaged with the side of the potato for guiding the paring blade 76 over the surface of the potato during rotation of the latter by the potato gripping rods 52 and 53. The different parts of the mechanism are so timed that when the screw block 64 has moved the full length of the reversely threaded portion 63 of the shaft 62, a potato will have been completely peeled, another potato delivered onto the lower run of the chain belt 47, the potato gripping rods 52 and 53 retracted for the release of the potato from the gripping fingers 54 when the guide wheel 73 moves beyond a gripped potato, the spring 70 associated with the lever arm 69 swings said lever arm to engage one side of the tiltable tray 78 for tilting the same to the position shown in Figure 9, at which time a peeled potato is delivered onto the discharge chute 104 secured as at 105 to one side of a lower panel 20 for collection in a receptacle, the potato peelings falling through the slotted opening 106 in the chute 104. Upon continued operation of the machine, the potato resting upon the lower run of the belt 47 is finally discharged through the opening 35 in the top wall 34 overlying the opening 18 and is similarly received between the potato gripping rods 52 and 53, the reverse or double threads 63 upon the shaft 62 causes the screw block 64 to move in the opposite direction over said shaft 62 for the peeling of a potato gripped in the rods 52 and 53.

From the above detailed description of the invention, it is believed that the construction and operation thereof will at once be apparent, and while there is herein shown and described the preferred embodiment of the invention, it is nevertheless to be understood that minor changes may be made therein without departing from the spirit and scope of the invention as claimed.

I claim:

1. In a potato peeling machine, a hopper, a pair of rotatable and reciprocable potato gripping rods below the hopper, tensioned in directions of movements towards each other, means for singly delivering potatoes from the hopper to the gripping rods, a tensioned paring cutter movable longitudinally of the gripping rods for paring a potato and a series of relatively timed operating means for the potato delivering means, gripping rods and paring cutter, the means for singly delivering potatoes to the gripping rods including a bottom wall for the hopper having an opening therein, a slidably mounted valve plate movable over the bottom wall of the hopper and having an opening therein adapted to register with the bottom wall opening and an endless belt having an opening therein movable into registry with the aforesaid openings when the opening therein is located in the upper run of the belt.

2. In a potato peeling machine, a hopper, a pair of rotatable and reciprocable potato gripping rods below the hopper, tensioned in directions of movements towards each other, means for singly delivering potatoes from the hopper to the gripping rods, a tensioned paring cutter movable longitudinally of the gripping rods for paring a potato and a series of relatively timed operating means for the potato delivering means, gripping rods and paring cutter, the means for singly delivering potatoes to the gripping rods including a bottom wall for the hopper having an opening therein, a slidably mounted valve plate movable over the bottom wall of the hopper and having an opening therein adapted to register with the bottom wall opening and an endless belt having an opening therein movable into registry with the aforesaid openings when the opening therein is located in the upper run of the belt, the paring cutter and operating means therefor including a reversely threaded shaft parallel with the potato gripping rods and disposed below the same, a screw block reciprocably movable over the threaded shaft, a tensioned lever arm pivotally supported on the screw block and carrying the cutter at its upper end movable towards said rods.

3. In a potato peeling machine, a hopper, a pair of rotatable and reciprocable potato gripping rods below the hopper, tensioned in directions of movements towards each other, means for singly delivering potatoes from the hopper to the gripping rods, a tensioned paring cutter movable longitudinally of the gripping rods for paring a potato and a series of relatively timed operating means for the potato delivering means, gripping rods and paring cutter, the means for singly delivering potatoes to the gripping rods including a bottom wall for the hopper having an opening therein, a slidably mounted valve plate movable over the bottom wall of the hopper and having an opening therein adapted to register with the bottom wall opening and an endless belt having an opening therein movable into registry with the aforesaid openings when the opening therein is located in the upper run of the belt, the paring cutter and operating means therefor including a reversely threaded shaft parallel with the potato gripping rods and disposed below the same, a screw block reciprocably movable over the threaded shaft, a tensioned lever arm pivotally supported on the screw block and carrying the cutter at its upper end movable towards said rods, and a guide wheel on the upper end of the lever arm adapted to move in rolling contact with a potato gripped between said rods for guiding the cutter over a potato.

4. In a potato peeling machine, a hopper, a pair of rotatable and reciprocable potato gripping rods below the hopper, tensioned in directions of movements towards each other, means for singly delivering potatoes from the hopper to the gripping rods, a tensioned paring cutter movable longitudinally of the gripping rods for paring a potato and a series of relatively timed operating means for the potato delivering means, gripping rods and paring cutter, the paring cutter and operating means therefor including a reversely threaded shaft parallel with the potato gripping rods and disposed below the same, a screw block reciprocably movable over the threaded shaft, a tensioned lever arm pivotally supported on the screw block and carrying the cutter at its upper end movable towards said rods, and the operating means for the gripping rods including abutments carried by said rods and cam arms adapted to engage and move said abutments for separating the potato gripping rods against tension thereon.

5. In a potato peeling machine, a hopper, a pair of rotatable and reciprocable potato gripping rods below the hopper, tensioned in directions of movements towards each other, means for singly delivering potatoes from the hopper to the gripping rods, a tensioned paring cutter movable longitudinally of the gripping rods for paring a potato and a series of relatively timed operating means for the potato delivering means, gripping rods and paring cutter, the means for singly delivering potatoes to the gripping rods including a bottom wall for the hopper having an opening therein, a slidably mounted valve plate movable over the bottom wall of the hopper and having an opening therein adapted to register with the bottom wall opening and an endless belt having an opening therein movable into registry with the aforesaid openings when the opening therein is located in the upper run of the belt, the paring cutter and operating means therefor including a reversely threaded shaft parallel with the potato gripping rods and disposed below the same, a screw block reciprocably movable over the threaded shaft, a tensioned lever arm pivotally supported on the screw block and carrying the cutter at its upper end movable towards said rods, and the operating means for the gripping rods including abutments carried by said rods and cam arms adapted to engage and move said abutments for separating the potato gripping rods against tension thereon.

6. In a potato peeling machine, a hopper, a pair of rotatable and reciprocable potato gripping rods below the hopper, tensioned in directions of movements towards each other, means for singly delivering potatoes from the hopper to the gripping rods, a tensioned paring cutter movable longitudinally of the gripping rods for paring a potato and a series of relatively timed operating means for the potato delivering means, gripping rods and paring cutter, the paring cutter and operating means therefor including a reversely threaded shaft parallel with the potato gripping rods and disposed below the same, a screw block reciprocably movable over the threaded shaft, a tensioned lever arm pivotally supported on the screw block and carrying the cutter at its upper end movable towards said rods, and a guide wheel on the upper end of the lever arm adapted to move in rolling contact with a potato gripped between said rods for guiding the cutter over a potato, and the operating means for the gripping rods including abutments carried by said rods and cam arms adapted to engage and move said abutments for separating the potato gripping rods against tension thereon.

7. In a potato peeling machine, a hopper, a pair of rotatable and reciprocable potato gripping rods below the hopper, tensioned in directions of movements towards each other, means for singly delivering potatoes from the hopper to the gripping rods, a tensioned paring cutter movable longitudinally of the gripping rods for paring a potato and a series of relatively timed operating means for the potato delivering means, gripping rods and paring cutter, the means for singly delivering potatoes to the gripping rods including a bottom wall for the hopper having an opening therein, a slidably mounted valve plate movable over the bottom wall of the hopper and having an opening therein adapted to register with the bottom wall opening and an endless belt having an opening therein movable into registry with the aforesaid openings when the opening therein is located in the upper run of the belt, the paring cutter and operating means therefor including a reversely threaded shaft parallel with the potato gripping rods and disposed below the same, a screw block reciprocably movable over the threaded shaft, a tensioned lever arm pivotally supported on the screw block and carrying the cutter at its upper end movable towards said rods, and a guide wheel on the upper end of the lever arm adapted to move in rolling contact with a potato gripped between said rods for guiding the cutter over a potato, and the operating means for the gripping rods including abutments carried by said rods and cam arms adapted to engage and move said abutments for separating the potato gripping rods against tension thereon.

8. In a potato peeling machine, a body portion, a central opening therein bordered by vertical end housings and a horizontal top housing, a hopper above the top housing, a slide valve closure for the lower end of the top housing, an endless belt having an opening therein having the runs thereof horizontally disposed in the top housing and cooperating with the slide valve closure, a horizontal potato gripping rod extending through each end housing below the top housing with the inner potato gripping ends projecting into the central opening in the body portion and the outer ends projecting outwardly of the end housings, cooperating guide means for the rods associated with the outer ends of the rods and body portion at the lower ends of the end housings, spring means for normally tensioning the gripping rods in directions towards each other, a reversely threaded shaft extending across said body opening and journalled at its ends in the walls of the end housings adjacent the lower ends thereof, means operating by said threaded shaft engageable with the guide means on said rods for moving the rods away from each other into potato releasing positions, a paring cutter having a screw block connection with said shaft for reciprocating movements longitudinally of the gripping rods, an operating motor, a gear train drive between the motor, potato gripping rods and threaded shaft, operative connections between the means for retracting one of the gripping rods and the endless belt and operative connections between the endless belt and slide valve closure for the hopper.

9. In a potato peeling machine, a hopper, a pair of rotatable and reciprocable potato gripping rods below the hopper, tensioned in directions of movements towards each other, means for singly delivering potatoes from the hopper to the gripping rods, a tensioned paring cutter movable longitudinally of the gripping rods for paring a potato and a series of relatively timed operating means for the potato delivering means, gripping rods and paring cutter, a resiliently mounted laterally tiltable potato receiving tray disposed below the gripping rods, a potato discharge chute disposed laterally of said tray and said tensioned paring cutter adapted to tilt the tray for the discharge of a peeled potato onto the chute.

10. In a potato peeling machine, a hopper, a pair of rotatable and reciprocable potato gripping rods below the hopper, tensioned in directions of movements towards each other, means for singly delivering potatoes from the hopper to the gripping rods, a tensioned paring cutter movable longitudinally of the gripping rods for paring a potato and a series of relatively timed operating means for the potato delivering means, gripping rods and paring cutter, the means for singly delivering potatoes to the gripping rods including a bottom wall for the hopper having an opening therein, a slidably mounted valve plate movable over the bottom wall of the hopper and having an opening therein adapted to register with the bottom wall opening and an endless belt having an opening therein movable into registry with the aforesaid openings when the opening therein is located in the upper run of the belt, a resiliently mounted laterally tiltable potato receiving tray disposed below the gripping rods, a potato discharge chute disposed laterally of said tray and said tensioned paring cutter adapted to tilt the tray for the discharge of a peeled potato onto the chute.

11. In a potato peeling machine, a hopper, a pair of rotatable and reciprocable potato gripping rods below the hopper, tensioned in directions of movements towards each other, means for singly delivering potatoes from the hopper to the gripping rods, a tensioned paring cutter movable longitudinally of the gripping rods for paring a potato and a series of relatively timed operating means for the potato delivering means, gripping rods and paring cutter, the paring cutter and operating means therefor including a reversely threaded shaft parallel with the potato gripping rods and disposed below the same, a screw block reciprocably movable over the threaded shaft, a tensioned lever arm pivotally supported on the screw block and carrying the cutter at its upper end movable towards said rods, a resiliently mounted laterally tiltable potato receiving tray disposed below the gripping rods, a potato discharge chute disposed laterally of said tray and said tensioned paring cutter adapted to tilt the tray for the discharge of a peeled potato onto the chute.

12. In a potato peeling machine, a hopper, a pair of rotatable and reciprocable potato gripping rods below the hopper, tensioned in directions of movements towards each other, means for singly delivering potatoes from the hopper to the gripping rods, a tensioned paring cutter movable longitudinally of the gripping rods for paring a potato and a series of relatively timed operating means for the potato delivering means, gripping rods and paring cutter, the means for singly delivering potatoes to the gripping rods including a bottom wall for the hopper having an opening therein, a slidably mounted valve plate movable over the bottom wall of the hopper and having an opening therein adapted to register with the bottom wall opening and an endless belt having an opening therein movable into registry with the aforesaid openings when the opening therein is located in the upper run of the belt, the paring cutter and operating means therefor including a reversely threaded shaft parallel with the potato gripping rods and disposed below the same, a screw block reciprocably movable over the threaded shaft, a tensioned lever arm pivotally supported on the screw block and carrying the cutter at its upper end movable towards said rods, a resiliently mounted laterally tiltable potato receiving tray disposed below the gripping rods, a potato discharge chute disposed laterally of said tray and said tensioned paring cutter adapted to tilt the tray for the discharge of a peeled potato onto the chute.

MICHAEL COMFORT.